United States Patent [19]

Chen et al.

[11] Patent Number: 5,035,927
[45] Date of Patent: Jul. 30, 1991

[54] TONER FUSING DEVICE AND METHOD OF USING THE SAME

[75] Inventors: Tsang J. Chen, Rochester; Paul L. Nielsen, Lima; Joseph A. Pavlisko, Pittsford, all of N.Y.

[73] Assignee: Eastman Kodak Company, Rochester, N.Y.

[21] Appl. No.: 543,925

[22] Filed: Jun. 26, 1990

[51] Int. Cl.$^5$ .................. B05D 3/12; B05C 11/00; G03G 13/20
[52] U.S. Cl. .................. 427/444; 427/141; 427/366; 118/60; 118/70; 430/99; 432/60
[58] Field of Search .................. 427/444, 14.1, 366; 118/60, 70; 430/99; 432/60

[56] References Cited

U.S. PATENT DOCUMENTS 4,518,655  5/1985  Henry et al. .................. 118/60 X
4,807,341  2/1989  Nielsen et al. .................. 118/60 X

OTHER PUBLICATIONS

Scouten, C., "Carboraue/Siloxane Elastomer Coatings . . . Copiers", Xerox Disclosure Journal, vol. 4, No. 3, May/Jun. 1979, pp. 281–282.

Primary Examiner—Evan Lawrence
Attorney, Agent, or Firm—Dana M. Schmidt

[57] ABSTRACT

A device for fusing and fixing electrophotographic toner powder to a receiver sheet and a method for using the same. The device comprises a first fusing member, such as a fusing roll, having a resilient surface for pressure contact with thermoplastic toner on the receiver sheet. A second member, which can be a non-resilient pressure roll, presses the toner into contact with the resilient surface. The device also is designed to heat the toner. The fusing member has a layer of an elastomeric, amorphous silarylene-siloxane alternating or random copolymer which is thermally stable, has good wear resistance, and good thermal conductivity and exhibits little or no swelling when contacted with poly(dimethylsiloxane) release oils.

17 Claims, No Drawings

TONER FUSING DEVICE AND METHOD OF USING THE SAME

FIELD OF THE INVENTION

This invention relates to devices useful for fusing heat-softenable toner material to a substrate and to methods for their use. More particularly, the invention concerns fusing rolls covered with crosslinked elastomeric copolymers.

BACKGROUND

In electrostatographic imaging and recording processes, for instance, in electrophotographic copying processes, an electrostatic latent image formed on a photoconductive surface is developed with a thermoplastic toner powder which is thereafter fused to a substrate. The fusion step commonly consists of passing the substrate, such as a sheet of paper on which toner powder is distributed in an image pattern, through the nip of a pair of rolls. At least one of the rolls is heated and has a resilient surface. Resilience is desirable so that the resilient roll will deform somewhat under pressure and create a significant area of contact with the other roll at the nip. In this way the residence time of toner in the heated nip is sufficient to fuse it to the paper.

A persistent problem with toner fusing devices is that when the toner is heated during passage through the rolls it may adhere not only to the paper but also to the fusing roll which contacts it. Any toner remaining on the roll can cause a false offset image to appear on the next sheet that passes through the nip and can also degrade the performance of the fusing roll.

To prevent toner offset many expedients have been tried such as covering the rolls with fluorocarbon polymers or silicone polymers of low surface energy. Also, poly(dimethylsiloxane) (also referred to as PDMS) oils have been applied as release liquids to the roll surfaces. With such materials, however, problems can occur.

One problem is that fluorocarbon polymers are difficult to wet with PDMS release oils, and the application of amounts sufficient to wet the roll can cause oil stains on the paper to which toner is being fused.

Although PDMS oils can prevent the build-up of toner on fusing rolls, they cause another problem, because they are compatible with poly(dimethylsiloxane) rubbers that are widely used as fusing roll covers. The poly(dimethylsiloxane) oils are absorbed by the poly(dimethylsiloxane) covering of the rolls upon repeated use and cause swelling of the rolls.

Because of the swelling of the rolls, defects appear in thermally fixed images. In particular, "step patterns" appear in the images when using various copy sheet sizes. These result from the differential swelling of the fuser roll inside and outside of the paper path, which causes non-uniform roll compression when different sizes of copy paper are used. There can also be increased wear on the roll and shortened useful fusing roll life, because of softening of the roll surface and degrading interaction of PDMS oil with the core or with adhesive interlayers.

Another fault of poly(dimethylsiloxane) rubber polymers as fuser roll covers is that they have a lower than desirable thermal conductivity, which leads to inefficient heating of the toner. Also, if the fuser roll is internally heated, low thermal conductivity requires high temperatures that can shorten the life of the fuser roll by causing thermal degradation, especially at the interface of the core and cover of the roll.

U.S. Pat. No. 4,430,406, discloses that swelling of a fusing roll can be controlled by spraying a fluorocarbon elastomer overcoat on the silicone elastomer roll cover. This method is costly, however, and only partially solves the problem.

U.S. Pat. No. 4,515,884 discloses the use of a release oil having a viscosity in the range from 7,000 to 20,000 centistokes, which allegedly reduces the problem. Even these materials, however, can lead to step patterns in the images.

Because of the swelling problems encountered with poly(dimethylsiloxane), it has been suggested in Japanese Kokai No. 59-209129, published Nov. 27, 1984, to make the roll covering from polymers containing some methylphenylsiloxane repeating units. Such polymers would perhaps be less compatible with poly(dimethylsiloxane) oils and hence less subject to swelling. Unfortunately, such polymers can degrade during preparation or use to yield siloxane compounds having single phenyl groups attached to silicon, which have been shown to exhibit estrogenic and sterility effects, making them undesirable for human contact.

A need exists for a fusing device having a resilient layer that has the useful properties of poly(dimethylsiloxane) elastomers but that is more thermally conductive, is more resistant to swelling by PDMS release oils, is thermally stable, and that does not yield estrogenic degradation products. The present invention provides such a fusing device and a method for using it.

SUMMARY OF THE INVENTION

The present invention provides a device for fusing heat-softenable toner material to a substrate. It comprises a first member or fusing member having a resilient surface for pressure contact with toner disposed on a substrate, a second member for pressing the toner on the substrate into contact with the resilient surface and means for heating at least one of the members. The resilient surface or another layer of the fusing member is formed of an elastomeric, amorphous silarylene-siloxane copolymer. In a preferred embodiment the invention provides a fusing roll comprising a cylindrical core and a layer of the described copolymer.

The invention also provides a method of using the new device in which a receiver sheet having a thermoplastic toner powder distributed on its surface is passed through the nip formed by a fusing roller and a pressure roller while heating the toner. The fusing roller in contact with the toner in the nip comprises a rigid core and a resilient covering, the latter being formed of an elastomeric silarylene-siloxane copolymer.

Important advantages of the polymeric surfaces of the fusing devices of the invention are that they are thermally stable, they are resistant to swelling by PDMS release oils, and they have a high degree of thermal conductivity.

DETAILED DESCRIPTION

The elastomers which form the surfaces of the fusing devices of the invention are crosslinked amorphous silarylenesiloxane copolymers. This is a class of polysiloxanes which contain divalent aromatic groups in the main chain of the polymer. The general structure of these polysiloxanes is:

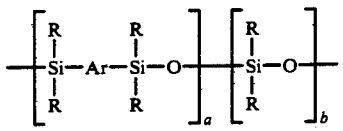

wherein Ar is a divalent aromatic radical and the substituents R are monovalent organic radicals which can be the same or different radicals. The divalent radical, Ar, can be, for example, phenylene, tolylene, xylylene, naphthylene, 4,4'-biphenylene, 4,4,'-diphenylene ether and the like. The monovalent radicals; R, can be, for example, radicals having from 1 to 12 carbon atoms such as lower alkyl, e.g., methyl, ethyl, and n-butyl; aryl such as phenyl and naphthyl; aralkyl such as tolyl and xylyl; and halogenated hydrocarbon radicals such as 3,3,3-trifluoropropyl and chlorophenyl.

Especially preferred of the polymers of structure I are those in which the divalent radical, Ar, is a diphenylene oxide radical of the structure,

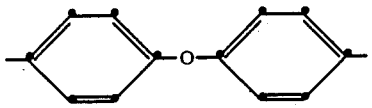

Although the silarylene-siloxane copolymers in general have high thermal stability, as described herein, a small degree of decomposition can occur when the polymer is heated to high temperature over a period of time. When the copolymer contains phenylene groups, trace amounts of benzene can be evolved. Although proper venting of the apparatus can prevent problems, nevertheless an advantage of the diphenylene oxide copolymer is that no benzene will be evolved.

The base polymer of structure I can be synthesized in known manner by the polycondensation of approximately equimolar proportions of reactive monomers having the units a or b of structure I. For example, a silarylenesilane diol of the formula, HO—Si(R-)$_2$—Ar—Si(R$_2$)—OH can be reacted with a dialkoxydiorganosiloxane or a bis(dialkylamino)silane of the formula, for example, CH$_3$O—Si(R)$_2$—OCH$_3$ or (CH$_3$)$_2$N—Si(R)$_2$—N(CH$_3$)$_2$, respectively, in the presence of a catalyst and an inert solvent. Useful methods of preparing such polymers and suitable variations in substituents for the monomers are disclosed, for example, in U.S. Pat. Nos. 4,340,711; 3,167,528; 3,302,634; 3,350,350; 3,959,403; and 4,102,941 and in publications by Lai et al, *J. Pol. Sci.*, Vol. 20, 2277-2288 (1982); Dvornic et al, *J. Appl. Pol. Sci.*, Vol. 25, 641-652 (1980); Dunnavant, "Silarylene and Silarylene-Siloxane Polymers", *Inorg. Macromol. Rev.*, 1 (1971) 165-189; and Burks et al, *J. Pol. Sci.*, Vol. II, 319-326 (1973). These and other patents, patent applications and publications cited herein are incorporated herein by reference.

Several of these references relate to block copolymers having crystalline segments, while the amorphous copolymers used in the fusing devices of the present invention are alternating or random polymers (as defined in U.S. Pat. No. 3,202,634). Nevertheless the substituents for the monomers, the catalysts and the solvents described in the block copolymer references can also be used for the alternating and random polymers which are used in the devices of the present invention.

The copolymer is referred to herein as being amorphous, by which is meant that it is entirely or predominantly amorphous. When the polymer is a random copolymer, minor crystalline domains can be present. To the extent that the polymer does have any crystalline segments they should be such a small portion of the copolymer that the crosslinked copolymer is a resilient elastomer.

The degree of polymerization of the base polymer is such that each of a and b of Structure I is in the range from about 20 to 2500. When the polymer is an alternating copolymer, a and b are approximately equal. If the copolymer is random, preferably a and b are also approximately equal although an excess of one or other other is permissible. If a and b are not in equimolar ratio, preferably the silarylene unit a is the larger. The reason for this is that an excess of diorganosiloxane units b can result in lower thermal stability and greater swell in PDMS fluid. See "Silarylene and Silaryl-Siloxane Polymers" by W. R. Dunnavant, Inorg. Macromol. Rev., 1 (1971) 165-189, 171.

On the other hand, if the ratio of a to b is too high the crystallinity of the "a" units becomes excessive, especially as the size or symmetry of the radical Ar increases. This can result in an undesirably high degree of crystallinity. In the desired polymers I, the ratio of a to b is sufficiently high (i.e., the b content is low enough) that the polymer, in comparison to PDMS elastomer, has greater thermal stability and less swell in PDMS fluid. Likewise, the ratio of a to b is sufficiently low (i.e., the a content is not too high) that the polymer does not have substantial crystalline blocks of "a" that would make the crosslinked copolymer non-resilient when used in a fusing roll.

In the preferred polymers for use in accordance with the invention, the ratios of a to b are in the range from about 0.25 to 4. Optimally the ratio is about 1.

The desired crosslinking of the base polymer is achieved by including crosslinking sites in the main chain of the base polymer. This can be done, for example, by including a minor amount of vinylsiloxane crosslinkable units in the base polymer. The proportion of such units can vary from about 0.1 to about 50 mole percent (preferably 5 to 10 mole percent) of the total structural units of the polymer, the exact amount depending on the desired physical properties of the crosslinked polymer. For instance, if a relatively hard surface is desired on the fusing device, the proportion of vinylsiloxane units can be from about 10 to 20 mole percent and if a softer surface is desired, the proportion can be from about 0.1 to 1 mole percent. The optimum proportion for a resilient polymer is from 2 to 5 mole percent when Ar and R of the base polymer are phenylene and methyl, respectively. In any event, the crosslinked polymer is an amorphous elastomer having a glass transition temperature ($T_g$) below 20° C.

In general, any crosslinking monomer containing vinylsiloxane groups can be used. The crosslinking monomers form internal and/or endcapping vinylsiloxane units in the base polymer, through which the polymer is crosslinked during the subsequent curing stage. Examples of preferred crosslinking monomers include 1,3-divinyltetramethyldisiloxane, 1,3,5,7-tetramethyl-1,3,5,7-tetravinylcyclotetrasiloxane, 1,3-divinyl-1,3-diphenyl-1,3-dimethyldisiloxane, and 1,3-divinyltetraphenyldisiloxane. Alternatively, the silarylene-siloxane copolymer can be cured by means of terminal silanol groups. These silanol groups can be condensed with active siloxane compounds by known room temperature vulcanization techniques.

Although an advantage of the present invention is in reducing the absorption of PDMS release oil by the fusing roll, a further advantage is that in the polymeric roll coverings of the invention the proportions of dimethylsiloxane units and silarylene units can be adjusted so that the polymer absorbs a limited and controlled amount of the oil. The benefit of this is that the roll, in effect, serves as a reservoir for oil in the event of any interruption in the normal supplying of release oil to the surface of the roll. If such oil supply is interrupted, the oil retained by the roll covering prevents any immediate image defects, which would occur with a covering of a totally nonabsorbing polymer such as a fluorocarbon polymer.

Likewise, because of its balanced dimethylsiloxane and silarylene content, the entire surface of the roll covering is readily wetted by a reasonably small amount of PDMS release oil. In contrast, a covering such as a fluorocarbon polymer which is incompatible with PDMS oil, requires an excessive amount of the oil to cover its surface. As a consequence of having to use so much oil to obtain toner release, the oil stains the paper on which toner is being fused by the fusing roll.

Thus, through the use of a roll covering which contains 20 to 80 mole percent, and preferably, 40 to 60 mole percent silarylene units (most preferably, 50 mole percent) and the rest principally dimethylsiloxane units, the absorption of a limited amount of PDMS oil in the roll covering is made possible. Furthermore, the roll covering can be wetted with PDMS oil without requiring so much of the oil as to cause staining of the copy paper.

In one way to prepare the base polymer, the monomers yielding the dimethylsiloxane, vinylsiloxane, and arylenesiloxane units in the noted proportions are mixed with a polymerization catalyst. The mixture is subjected to bulk polymerization at an elevated temperature, e.g., 50° C. to 200° C. and most suitably in the range from 150° to 170° C. until a base polymer having the desired molecular weight is obtained, e.g., for, silphenylene-dimethylsiloxane copolymer, a weight average molecular weight from about 300,000 to 500,000 or higher, and preferably approximately 400,000. To achieve such a degree of polymerization it is usually desirable to maintain the reactants and catalyst in the indicated temperature range for a period of about 1 to 48 hours, preferably 20 to 22 hours.

Useful catalysts for forming the base polymer include catalysts such as potassium trimethylsilanolate and potassium, sodium, or cesium hydroxides. Also useful are the so-called "transient" catalysts such as tetramethylammonium silanolate and n-butyltricyclohexylphosphonium silanolate.

No reaction solvents are necessary when one or more of the monomers is a liquid. Octamethylcyclotetrasiloxane is an example of such a liquid monomer. Suitable solvents when none of the monomers are liquids include aromatic hydrocarbons such as toluene and xylene.

Another method for preparing the base polymer is by the condensation of approximately equal molar quantities of a silphenylenediol monomer and a reactive comonomer such as bis(dimethylamine)dialkylsilane in the presence of a solvent such as toluene. This method is especially useful for the preparation of exactly alternating silphenyl copolymers that are silanol terminated.

The polysiloxanes of use in this invention can also comprise minor amounts of other organosiloxane units, e.g., other alkylsiloxane units such as diethylsiloxane and other endcapping moieties such as those formed from hexamethyldisiloxane, decamethyltetrasiloxane, 1,3-diphenyltetramethyldisiloxane, and 1,1,5,5-tetraphenyl-1,3,3,5-tetramethyltrisiloxane. It is also possible to blend the base copolymer with other polysiloxanes. For example, if the silarylene content of the copolymer is higher than desired, the properties of the final cross-linked polymeric roll cover can be adjusted somewhat by blending the base polymer with a poly(dimethylsiloxane) gum before curing to form the fuser roll cover.

The polymeric covering of the fusing roll of the invention can contain one or more addenda such as fillers and release agents. Examples of useful fillers include alumina, fumed silica, precipitated silica and ferric oxide. Silica can be used in a concentration from about 1 to 35 weight percent of the covering to improve the physical strength of the covering. Alumina in a concentration from about 30 to 75 weight percent of the covering improves the thermal conductivity of the covering. It is desirably included if the roll is to be internally heated during toner fusing but is not essential if external heating is used. Ferric oxide in amounts from about 1 to 10 weight percent serves as a thermal stabilizer for the polymer. The inorganic fillers, alumina and ferric oxide, also strengthen the polymer and, therefore, when they are used, other strengthening or reinforcing fillers such as silica can be eliminated or used in lower concentrations.

Release agents are substances which further reduce the adhesion of toner to the roll covering and can, if desired, be blended with the base polymer in minor concentrations, e.g., 5 to 25 weight percent. Examples include poly(tetrafluoroethylene), boron nitride and fluorinated graphite.

The fusing device of the invention can include fusing surfaces in the form of rolls, or plates or continuous belts. However, the preferred fusing device of the invention employs a fusing roll which comprises a cylindrical core having a surface covering of the cured elastomer, preferably containing one or more filler substances and, optionally, other addenda. The core comprises any rigid metal or plastic substance. Suitable core materials include aluminum, steel and various alloys and polymeric materials such as thermoset resins, with or without fiber reinforcement.

The fusing device of the invention comprises a first member, preferably a roll, which has a resilient surface for pressure contact with thermoplastic toner disposed on a substrate, e.g., on a receiver sheet such as a sheet of paper. The resilient surface is formed of the elastomeric silarylene-siloxane copolymer described above. The device also includes a second fusing member for pressing toner into contact with the resilient surface of the first member. Advantageously, the second member is a rigid, non-resilient member such as a plate or belt or, most preferably, a metallic roll adjacent and parallel to the first member and forming a nip therewith.

The fusing device can be of many different forms, but a preferred roll form has a structure such as indicated diagrammatically in U.S. Pat. No. 4,294,536 (see, e.g., fusing station 27 of FIG. 1), U.S. Pat. No. 4,501,482 and U.S. Pat. No. 4,199,626, all of which patents are incorporated herein by reference. Besides the described members, the fusing device also includes a means for heating the toner to a softening temperature. The heating means, not shown in the drawings of the cited patents can, for example, be resistance heating means for one or both of the rolls or other pressure members or can be an infrared radiation source. It can also be a means which indirectly heats the toner as in the thermally assisted transfer of toner wherein the receiver sheet is heated. Because of their good thermal conductivity the described silarylene-siloxane copolymers are especially advantageous as roller coverings for fusing rolls that are internally heated, as by resistance heating of a cylindrical metal core. In this embodiment, heat is supplied to the toner from the core and through the heat-conductive resilient copolymer layer of the fusing roll.

Although the described silarylene-siloxane copolymer advantageously can form the surface of the fusing roll of the invention, in another advantageous embodiment of the invention, the copolymer provides a barrier layer between a resilient surface layer and the core. This is useful when such a surface layer such as PDMS has excellent release properties but swells so much when contacted with PDMS release oils that it tends to delaminate from the core. In accordance with the invention, a thin layer of the silarylene-siloxane copolymer (e.g., 0.5 to 3 mils thickness) can adhere strongly to the core because it does not swell substantially and will protect a thicker PDMS surface layer (e.g., 8 to 12 mils) from delamination. It is also possible to place the copolymer layer between two such swellable PDMS layers and the copolymer layer will serve as a barrier and prevent delamination of the concentric inner layer of PDMS elastomer from the core.

The fusing roll of the invention is fabricated by first preparing a mixture to be used to form the resilient surface. The mixture comprises the base polymer of choice, any other polymers and other addenda, such as inorganic fillers and release agents, desired to be included in the covering (such as described previously herein), and an appropriate crosslinker and catalyst.

The ingredients of the mixture are blended together by any convenient means, for example, by milling all the ingredients together on a two-roll mill.

A covering of the mixture, e.g., in sheet form of 0.5 to 3 mm thickness, is then placed on the cylindrical core and molded to the core by any convenient means, but preferably by known techniques of compression molding using heat and pressure, with the heat being sufficient to cause at least some crosslinking of the polymer.

The covered roll is then cooled, removed from the molding apparatus, and subjected to a further heat treatment sufficient to complete the crosslinking and drive any volatile materials out of the covering. The post-molding heat treatment is preferably carried out, at least in part, at temperatures above 200° C. For example, in some of the preferred embodiments, the post-molding treatment is at 149° C. for 3 hours, then at 177° C. for 3 hours, and then at 204° C. for 16 hours.

If desired, the covered roll can then be ground down to desired diameter by any known technique.

Rolls produced in accordance with the invention have been used as fuser rolls and have been otherwise tested to determine various physical properties thereof. When used as fuser rolls, with application of heat and PDMS release liquids thereto, the rolls have exhibited good fusing performance and durability over long copy runs. Their superior resistance to swelling by PDMS oils has resulted in reduction or elimination of step patterns. Their hardness, resilience, compressibility, tensile strength and thermal conductivity are good and their resistance to thermal degradation is excellent.

The following preparations and examples illustrate the preparation of silarylene-siloxane polymers and the superior properties of fusing rolls of the invention in comparison to other rolls. Parts and percentages are by weight unless otherwise specified.

EXAMPLE 1

Vinyl-modified Alternating Copolymers of Tetramethylphenyldisiloxane and Dimethylsiloxane

A. Polymer Synthesis

To a 100 mL 3-neck round bottom flask equipped with a nitrogen inlet, mechanical stirrer and reflux condenser was charged 20 g, bis(dimethylamino)dimethylsilane, 1.2 g bis(dimethylamino)methylvinylsilane, 33.96 g tetramethylphenyldisilanol and 60 mL dry toluene. The reaction mixture was heated at reflux for one hour. A solution of 2 g bis(dimethylamino)dimethylsilane in 10 mL of toluene was added dropwise to the reaction solution over a period of three hours. The addition was stopped when no further increase in the reaction solution viscosity could be observed. The reaction solution was precipitated in 500 mL methanol and dried in vacuum at 40° C. for 96 hours. The yield was 37 g of a clear viscous gum containing approximately 2 mole percent vinyl groups.

B. Preparation of Peroxide-Cured Elastomer Plaques

The copolymer gum prepared as described above and blended with about 33 wt. % silica was blended with 1% by weight of "Luperco CST" 2,4-dichlorobenzoyl peroxide (a product of Pennwalt Corp.) crosslinking initiator. Plaques of the blended polymer were pressed at 3000 psi and 177° C. for 10 minutes, then post cured at 200° C. for 16 hours.

EXAMPLE 2

Vinyl-Modified Alternating Copolymer of Tetramethylphenyldisiloxane and Dimethylsiloxane—Highly Crosslinked A silphenylene-siloxane copolymer was synthesized, blended with silica and cured substantially as in Example 1 except that the polymer contained 10 mol % vinyl groups instead of 2.5 mol % as in Example 1. As a consequence the cured plaques were substantially more highly crosslinked than the plaques of Example 1.

COMPARATIVE TESTS

The alternating silphenylene-siloxane elastomers prepared as in Examples 1 and 2 were tested for swelling in PDMS fluid and were compared with a commercial, thermally conductive polydimethylsiloxane elastomer. After seven days immersion in the PDMS fluid (visc.=60K cps) at 350° F. (177° C.). The samples were then weighed and the results were as follows:

|  | Vinyl Content mol % | Weight Change, % |
|---|---|---|
| Ex. 1 | 2.5 | −1.7 |
| Ex. 2 | 10 | −0.5 |
| PDMS Elastomer | — | +2.4 |

The above results show that the two examples of the invention both lost some weight, whereas the commercial PDMS elastomer gained weight by absorbing the PDMS fluid. The loss in weight simply means that some extractable material was extracted during the period of soaking in the PDMS fluid and that the more highly crosslinked sample (Ex. 2) contained less extractable material. The significant fact, however, is that neither of the elastomer samples of the invention gained weight by absorbing PDMS fluid while the PDMS elastomer gained weight and consequently swelled substantially by absorbing PDMS fluid.

EXAMPLE 3

Silanol-Terminated Alternating Copolymer of Tetramethylphenyldisiloxane and Dimethylsiloxane

A. Polymer Synthesis

A 5 liter three-neck flask equipped with a mechanical stirrer, nitrogen inlet, addition funnel and reflux condenser was charged with 250 mL toluene and 500 g of tetramethylphenyldisilanol. The addition funnel was charged with 323.1 g bis(dimethylamino)dimethylsilane and the reaction solution heated to 100° C.. To the solution was added the bis(dimethylamino)dimethylsilane in a degassed manner. The addition required approximately three hours. An additional solution of 32 g bis(dimethylamino)dimethylsilane in 250 mL toluene was added dropwise until no further increase in solution viscosity was observed. The viscous reaction solution was stirred at 100° C. for 12 hours. 100 mL water was then added and the solution was heated under reflux for 1 hour. The reaction mixture was precipitated into 3.5 liters of methanol. The methanol was decanted and the process was repeated. The viscous gum was dried at 80° C. under vacuum for 24 hours to yield 600 g of a clear gum with Inherent Viscosity=1.05 dl/g (THF at 25° C.) and an $M_n$=32,058 with a dispersity=7.54 (polystyrene equivalent molecular weight).

B. Condensation Cure

The resulting polymer was blended with the fillers, 33 vol. % $Al_2O_3$ and 2.9 vol. % $Fe_2O_3$, and with 3.02 vol. % polyethylsilicate crosslinking agent and 0.48 vol. % dibutyl tin dilaurate catalyst on a two-roll mill at 65° C. for 45 minutes. Plaques of the blended polymer were molded at room temperature and maintained at 3000 psi for several hours. The plaques were released from the mold, cured at room temperature for 48 hours at 50% relative humidity. They were post cured at 65° C. for two days, followed by step curing to 200° C. over a 12 hour period.

C. Tests

The plaques were tested for thermal conductivity and compared with a conventional PDMS elastomer which also contained $Al_2O_3$ and $Fe_2O_3$ fillers. The thermal conductivity for the silphenylene-siloxane copolymer plaques was 0.41 BTU/hr-ft-°F. By comparison the conventional PDMS elastomer had a thermal conductivity of only 0.35 even though the filler content was higher (38 vol. %).

EXAMPLE 4

Vinyl-terminated Random Copolymer of Tetramethylphenyldisiloxane and Dimethylsiloxane

A. Polymer Synthesis

To a 250 mL three-neck round bottom flask equipped with reflux condenser, nitrogen inlet and mechanical stirrer was charged 45 g tetramethylphenyldisilanol, 50 g octamethylcyclotetrasiloxane, 1 g bis(vinyltetramethyl)disiloxane, and 0.05 g potassium trimethylsilanolate. The reaction mixture was heated at 150° C. for 24 hours and followed by addition of 0.15 g triphenylphosphate and additional stirring for 3 hours at 150° C. The reaction solution was then placed under vacuum of 3 mm Hg and heated to 180° C. while collecting the volatile reaction component. The polymeric reaction product was cooled to room temperature. The yield was 90 g of a clear viscous gum.

B. Roll Preparation

To prepare an elastomeric fuser roll covering from the vinyl-terminated copolymer the following materials were selected:
- 35.2 g Vinyl-terminated polydimethyl-co-silphenylenesiloxane
- 105.6 g Mixed aluminum oxide/iron oxide fillers (33/2.9 vol. % ratio)
- 11.0 g Methyltriethoxysilane
- 0.1 g 1,4-butanediol
- 2.25 g Poly(dimethyl-co-methylhydrosilane)—Crosslinker
- 0.1 g Platinum catalyst To a 500 mL resin kettle was charged the vinyl terminated copolymer, the mixed fillers and the methyltriethoxysilane. The contents were stirred overnight followed by heating to 175° C. under vacuum for two hours. The contents were cooled to room temperature, 70 g of 2-butanone were added and mixed for 24 hours. To the mixture was added 0.1 g 1,4-butanediol followed by the crosslinking agent, poly(dimethyl-co-methylhydrosilane). After mixing for one-half hour the catalyst was added and the formulation was coated over an addition-cured poly(dimethylsiloxane) fuser roll having a metal core, substantially as described in U.S. Pat. No. 4,807,341 which is incorporated herein by reference.

C. Roll Tests

The roll having the silphenylene copolymer covering prepared as described above was tested as a fuser roller for thermoplastic toner on paper while contacting the roll with PDMS wicking oil. After fusing 100K copies the "step wear" (which is the elastomer thickness difference inside and outside the paper path) was about 1.1 mils. In a comparative test of a conventional vinyl-terminated PDMS-covered roll the step-wear for the same number of copies was 1.5 mils. This difference, although seemingly small, is an unexpected and valuable improvement in a known device which is already highly developed.

The next example describes the preparation of a preferred polymer for use in fusing devices of the invention. The arylene group of the silarylene-siloxane copolymer is a diphenylene oxide group.

EXAMPLE 6

Preparation of Alternating Copolymers With Dimethylsiloxane and p,p'-Bis(dimethylsilyl) Diphenylene Oxide as Repeating Units In a one liter three-necked flask were charged 150 g of bis-((p-dimethylhydroxysilyl)phenyl)ether, 65 g of bis(dimethylamino)dimethylsilane, and 400 ml of dry toluene. The mixture was heated under nitrogen atmosphere to obtain a clear solution (about 50° C.). Temperature was raised to 108° C., and 3.90 g of diamine were added in 5 increments over one hour period, maintaining at reflux temperature of about 109° C. Heating continued overnight under moderate stirring. Now 50 ml of water were added very slowly, and temperature was kept at 85° C. till no evolution of free amine was detected by wet pH paper. The content was poured into 2 liters of methanol to recover the polymer, and the polymer was washed three times with fresh methanol. The polymer was dried at 100° C. in a vacuum oven for 24 hours, and then at 140° C. overnight. The yield was 156 g. Further heating at 160° C. for 3 hours showed no change in weight. Inherent viscosity (I.V.) was measured in THF (0.89 dl/g), and styrene equivalent M.W. was found to be 232,000. Tg= −18° C.

EXAMPLES 7 through 9

Different batches of polymers were prepared according to procedures similar to that of Example 6. Results are shown below:

|  | I.V. | M.W. |
|---|---|---|
| Example 7 | — | 80,300 |
| 8 | 1.80 | 684,000 |
| 9 | 2.17 | 818,000 |

Thermogravimetric analysis was carried out in air at a heating rate of 10° C./min. for the polymers described in the above examples. The results are shown in the following table in terms of the temperatures at which 5% and 10% weight losses occurred.

|  | (5% Wt. Loss T. °C.) | (10% Wt. Loss T. °C.) |
|---|---|---|
| Example 6 | 525 | 553 |
| 7 | 467 | 553 |
| 8 | 502 | 575 |
| 9 | 481 | 571 |
| PDMS* | 340 | 368 |

*PDMS elastomer "PS342.5" of 18,000 M.W., OH-terminated, from Petrarch Systems Inc.

The data show that the alternating copolymers of silphenylenes exhibit substantial advantages in heat resistance over OH-terminated PDMS, and that fusing rollers prepared from the polymers will provide improvement in thermal stability.

Although the invention has been described in detail with particular reference to certain preferred embodiments thereof, it should be appreciated that variations and modifications can be effected within the spirit and scope of the invention.

What is claimed is:

1. A toner fusing device comprising a first member having a resilient surface for pressure contact with thermoplastic toner on a receiver sheet, a second member for pressing the receiver sheet into contact with said first member and means for heating the toner, said first member having a layer of an elastomeric amorphous silarylene-siloxane random or alternating copolymer.

2. A device according to claim 1, wherein said first member comprises a cylindrical core having a concentric layer formed of said elastomeric copolymer.

3. A device according to claim 2 wherein said silarylene-siloxane copolymer layer forms the surface of the first member.

4. A device according to claim 2 wherein said silarylene-siloxane copolymer layer is a barrier layer between the core and the surface of the first member.

5. A device according to claim 2, wherein said second member is a non-resilient, rigid cylinder disposed adjacent and parallel to the first member to form a nip therewith.

6. A device according to claim 1, wherein said copolymer is a silphenylene-siloxane copolymer.

7. A device according to claim 1 wherein said copolymer contains diphenylene oxide repeating units.

8. A device according to claim 1, wherein said copolymer is an alternating copolymer comprising dimethylsiloxane and p,p'-bis(dimethylsilyl)phenylene units in approximately equimolar proportions.

9. A device according to claim 1, wherein said copolymer is an alternating copolymer comprising dimethylsiloxane and p,p'-bis(dimethylsilyl)diphenylene oxide units in approximately equimolar proportions.

10. A device according to claim 1, wherein said copolymer has a Tg below 20° C. and is blended with alumina and ferric oxide fillers.

11. A method of fusing thermoplastic toner powder to a receiver sheet which comprises
    passing said receiver sheet having thermoplastic toner powder distributed on its surface through the nip formed by a fusing roll and a pressure roll while heating the toner,
    said fusing roll in contact with the toner in the nip comprising a rigid core and a layer of an elastomeric, amorphous, silarylene-siloxane random or alternating copolymer.

12. The method according to claim 11 wherein said copolymer is a silphenylene-siloxane copolymer.

13. The method according to claim 11 wherein said copolymer contains diphenylene oxide repeating units.

14. The method according to claim 11 wherein said copolymer is an alternating copolymer comprising dimethylsiloxane and p,p'-bis(dimethylsilyl)phenylene units in approximately equimolar proportions.

15. The method according to claim 11 wherein said copolymer is an alternating copolymer comprising dimethylsiloxane and p,p'-bis(dimethylsilyl)diphenylene oxide units in approximately equimolar proportions.

16. The method according to claim 11 wherein heat is supplied to the toner from the core and through the copolymer layer of the fusing roll.

17. The method according to claim 11 wherein said copolymer has a Tg below 20° C. and is blended with alumina and ferric oxide fillers.

* * * * *